United States Patent [19]
Caudill, Jr.

[11] 3,961,823
[45] June 8, 1976

[54] VEHICLE SEAT BOLSTER WIRE ASSEMBLY

[75] Inventor: Charles Caudill, Jr., Warren, Mich.

[73] Assignee: General Motors Corporation, Detroit, Mich.

[22] Filed: Sept. 9, 1974

[21] Appl. No.: 504,024

[52] U.S. Cl. .................. 297/452; 5/354; 297/DIG. 1
[51] Int. Cl.² ............................................. A47C 7/18
[58] Field of Search .............. 297/452, DIG. 1, 456; 5/354

[56] References Cited
UNITED STATES PATENTS

| | | | |
|---|---|---|---|
| 2,962,088 | 11/1960 | Gleason | 5/354 |
| 3,195,955 | 7/1965 | Richardson et al. | 297/456 X |
| 3,384,148 | 5/1968 | Sarginson et al. | 297/452 |
| 3,630,572 | 12/1971 | Homier | 297/454 |
| 3,632,164 | 1/1972 | Radke | 297/452 X |
| 3,727,980 | 4/1973 | Tischler | 297/452 |
| 3,840,269 | 10/1974 | Ambrose | 297/452 |
| 3,848,926 | 11/1974 | Kuroishi | 297/452 |
| 3,853,352 | 12/1974 | Ambrose | 297/452 |

FOREIGN PATENTS OR APPLICATIONS

| | | | |
|---|---|---|---|
| 2,023,803 | 2/1971 | Germany | 297/452 |

Primary Examiner—Roy D. Frazier
Assistant Examiner—Darrell Marquette
Attorney, Agent, or Firm—C. E. Leahy

[57] ABSTRACT

A bolster wire assembly is embedded in the resilient foam cushion of a vehicle seat to permit attachment of a seat cover to the foam cushion. The bolster wire assembly includes a wire having a strip of molded plastic mesh attached to and extending continuously therealong. The strip of plastic mesh has a plurality of interstices therein permitting the foam to flow through the plastic mesh during the foaming of the resilient foam cushion so that the strip of plastic mesh is embedded in the foam cushion to thereby anchor the bolster wire in the foam cushion. Conventional fasteners such as hog rings may then be employed to attach a list on the seat cover to the bolster wire.

3 Claims, 5 Drawing Figures

VEHICLE SEAT BOLSTER WIRE ASSEMBLY

The invention relates to a vehicle seat and more particularly to a bolster wire assembly for attaching a seat cover to the resilient foam cushion of a vehicle seat.

Conventional vehicle seats include a resilient foam cushion and a fabric or vinyl seat cover for covering the foam cushion. It is desirable in such vehicle seats to provide a slot in the surface of the foam cushion and to anchor the seat cover in the slot so as to provide a uniform and aesthetically pleasing contour for the accommodation of a seat occupant.

It is known to include a lower wire embedded in the foam cushion below the surface thereof and an upper wire entrapped within a sleeve fastened to the underside of the seat cover. Conventional hog rings are then used to connect the two wires and thereby maintain the seat cover on the foam cushion. This particular structure presents a problem to the assembly line worker in that the lower wire is concealed from view by the foam cushion in which it is embedded.

It is also known to provide a wire entrapped within a sleeve fastened to the underside of the seat cover and a plurality of isolated metallic anchoring discs which are embedded in the foam cushion below the surface. Conventional hog rings connect the sleeve and an integral hook provided in the discs. It will be apparent that it would be difficult for the assembly worker to locate such isolated anchors beneath the surface of the foam cushion during the hog ringing operation.

The present invention provides an improved bolster wire assembly for attaching the seat cover within a slot of the resilient foam cushion. The bolster wire has a strip of plastic mesh attached to and extending continuously along the wire. The strip of plastic mesh includes a plurality of arms extending laterally of the wire at spaced intervals therealong and a plurality of longitudinally extending continuous members spaced laterally of the wire and integrally molded with and connecting the arms. The attachment between the wire and the strip of plastic mesh is effected by overlaying the wire with a strip of fabric and then sewing the fabric to the plastic mesh. Alternatively, the mesh may be made as a strip integrally extruded with the wire by conventional plastic extrusion processng and then punching holes in the strip. The bolster wire assembly is located within the mold for the seat cushion and the foam is molded thereabout in such a manner that the wire is located at the bottom of the slot in the cushion and a substantial portion of the plastic mesh is embedded in the foam cushion. The seat cover has a conventional list sewn thereto and a list wire is captured therein. The seat assembler attaches the seat cover to the foam cushion by conventional hog rings which encircle the list wire and the bolster wire. The operation is facilitated by the visible presence of the bolster wire at or near the bottom of the slot.

One feature of the invention is the anchoring of a bolster wire in a foam cushion at the surface of a slot therein so as to be visibly present and thereby facilitate attachment of the seat cover thereto.

A further feature of the invention is the provision of a lightweight non-metallic bolster wire anchoring assembly which will not tend to cut the resilient foam cushion.

These and other objects, features and advantages of the invention will become apparent upon consideration of the specification and the appended drawings in which.

Figure 1:
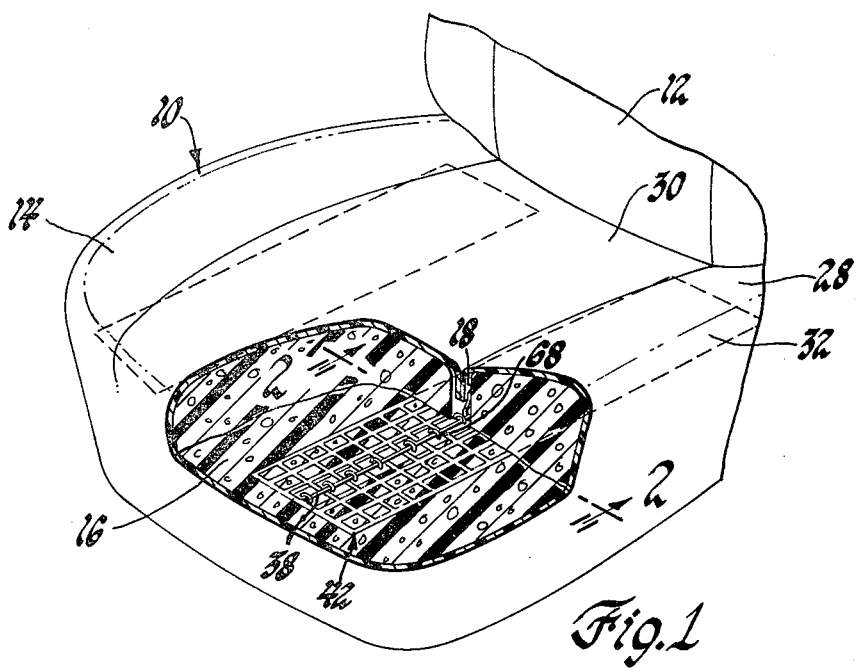
FIG. 1 is a perspective view in partial section of a preferred embodiment of the invention.

Referring to FIG. 1 a vehicle seat 10 is shown and includes a seat back 12 and a seat bottom 14. The seat bottom 14 includes a molded resilient foam cushion 16. The mold in which the resilient foam cushion 16 is foamed is constructed to provide a slot 18 in the resilient foam cushion 16. The slot 18 is formed by side walls 22 and 24 and a bottom wall 26. The resilient foam cushion is covered by conventional fabric or vinyl seat cover 28 including portions 30 and 32. The portions 30 and 32 are sewn together at 33 and are also sewn to a conventional fabric list 34. The list is folded back upon itself being sewn to the seat cover portion 30 and 32 so that a conventional list wire 38 is captured therein.

Figure 2:
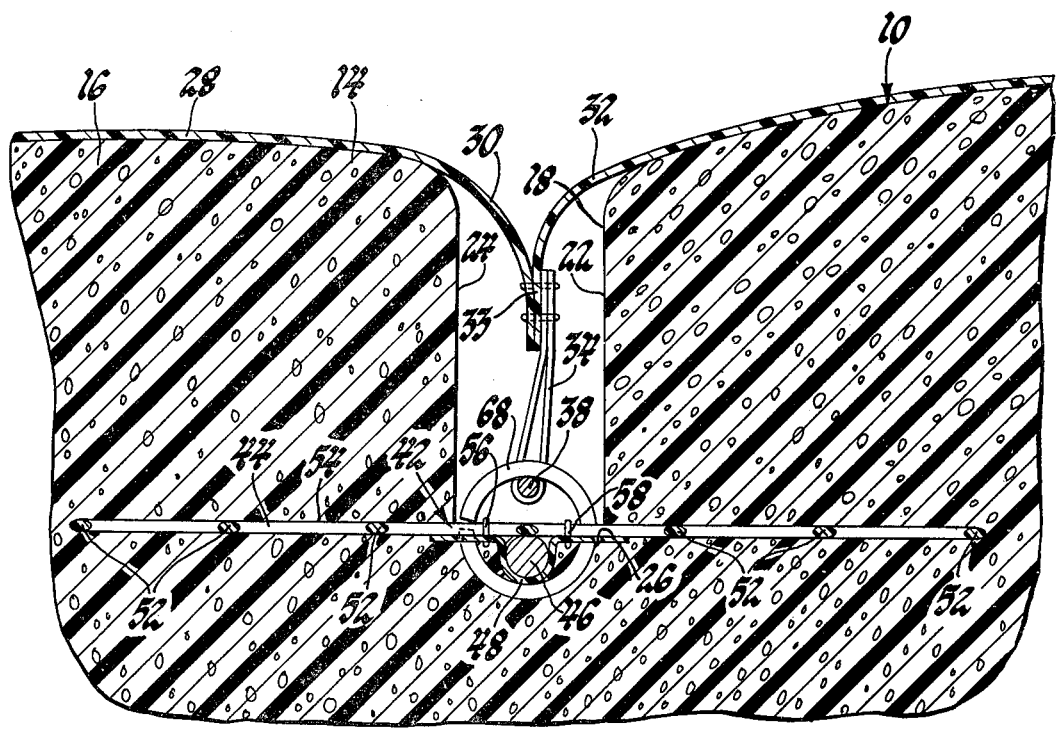
FIG. 2 is a sectional view taken in the direction of arrows 2—2 of FIG. 1.
Figure 3:
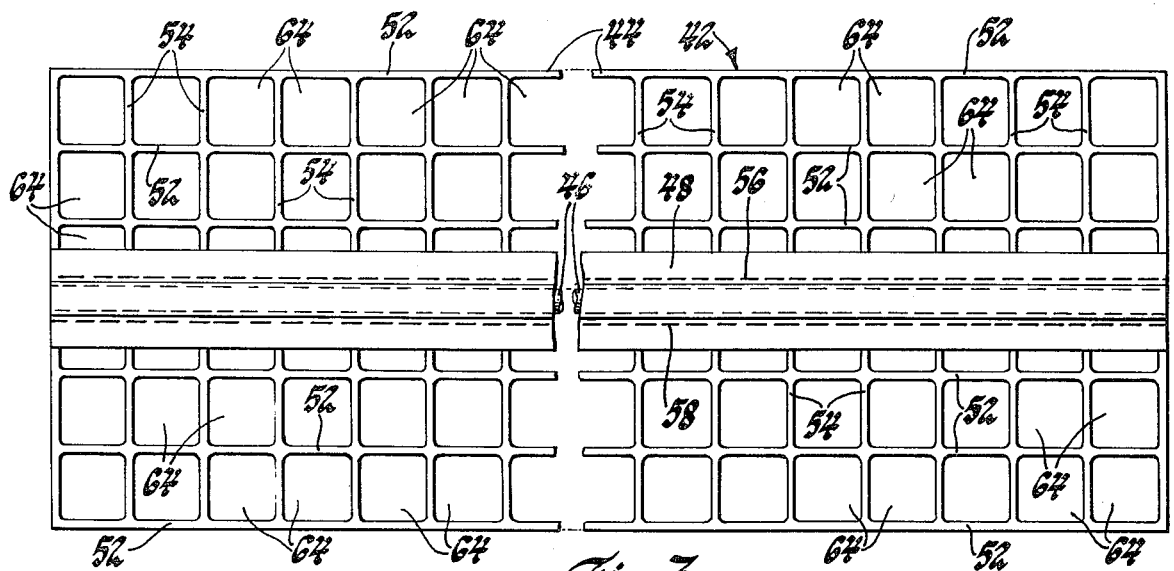
FIG. 3 is a plan view of the bolster wire assembly of FIGS. 1 and 2.

The list 34 and the list wire 38 are anchored to the resilient foam cushion 16 by a bolster wire assembly indicated generally at 42. Referring to FIGS. 2 and 3, it is seen that the bolster wire assembly includes a strip of mesh 44, a bolster wire 46, and a strip of fabric 48. As best seen in FIG. 3 the mesh 44 is of molded plastic and includes a plurality of longitudinally extending continuous members 52 spaced laterally of the bolster wire 46. These longitudinally extending members 52 are connected by a plurality of arms 54 which extend laterally of the bolster wire 46 at spaced intervals therealong, and are integrally molded with the longitudinally extending members 52. The strip of mesh 44 is attached to the bolster wire 46 by the strip of fabric 48 which overlays the bolster wire 46 and is sewn to the mesh along the edge of the wire as at 56 and 58 of FIG 2.

The bolster wire assembly 42 is placed in the mold prior to foaming operation. The bolster wire assembly 42 is located so that the mesh 44 overlays the bolster wire 46 and the bolster wire 46 is located at the bottom wall 26 of the slot 20 with the fabric strip 48 defining the bottom wall. The mesh 44 is of a width sufficient to extend beyond the side walls 22 and 24 so as to be embedded in the resilient foam cushion 16 as it is foamed. The interstices 64 defined by the arms 54 and members 52 allow the foam to flow through the mesh 44 to enhance embedment of the mesh 44 in the resilient foam cushion 16. The list wire 38 is attached to the bolster wire 46 by conventional hog rings 68 which are installed to encircle the two wires at spaced intervals along their length. The hog ringing operation is simplified by the visible presence of the bolster wire assembly 42 at the bottom of the slot 18. As the seat cover 28 is tensioned by the presence of an occupant thereon, list 34 is tensioned and the list wire 38 is anchored to the foam cushion 16 by the bolster wire assembly 42. It will be apparent that the shape of the slot 18 may be widely varied as dictated by the desired contour for the seat cover.

Figure 4:
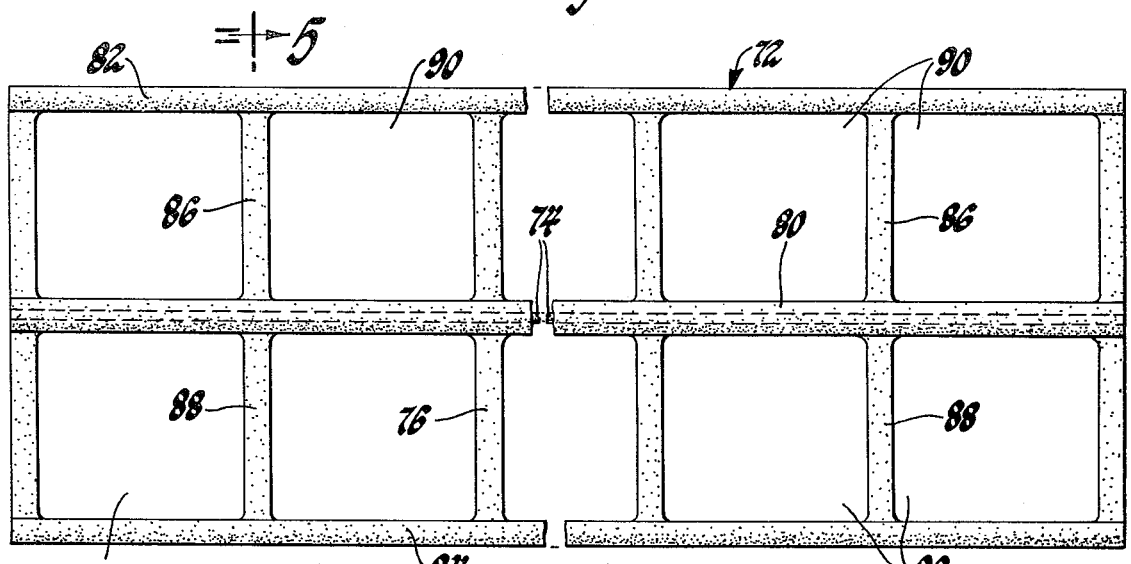
FIG. 4 is a plan view of a second embodimet of the bolster wire assembly of this invention.
Figure 5:
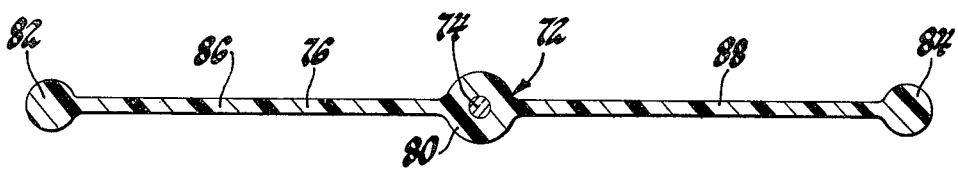
FIG. 5 is a sectional view taken in the direction of FIG. 4.

Referring to FIGS. 4 and 5 an alternate construction of the bolster wire assembly is shown. In the embodiment of FIGS. 4 and 5, the bolster wire assembly 72 is an extruded construction with the bolster wire 74 extruded into a plastic mesh 76. The bolster wire 72 includes a central backbone 80 and members 82 and 84 which are spaced laterally on each side of the backbone 80. The outboard members 82 and 84 are connected to the backbone 80 by extruded ribs 86 and 88 having interstices 90. The interstices are formed in the bolster wire assembly 72 by die cutting the ribs after extrusion.

It will be noted that while the strip of plastic mesh is shown herein as being formed of members which cross each other a 90° and extend either parallel or perpendicular to the bolster wire to provide rectangular interstices, the plastic mesh could be formed in any configuration of members which would provide a strip of mesh having adequate strength and random or ordered interstices to enhance embedment of the mesh strip in the resilient foam.

Thus it is seen that the invention provides an improved bolster wire assembly for anchoring a seat cover to a resilient foam cushion.

What is claimed is:

1. A vehicle seat comprising: a resilient foam cushion having an upwardly opening slot therein defined by side walls and a bottom wall, a plastic mesh strip having interstices therein, the plastic mesh strip traversing the slot across the bottom wall thereof and being visible at the bottom of the slot, the plastic mesh strip having portions thereof extending beyond the side walls of the slot with a plurality of the interstices having foam therein to embed the mesh strip in the foam cushion, a wire underlying the mesh strip and extending continuously along the bottom wall of the slot generally intermediate the side walls thereof, a strip of fabric of a width greater than the diameter of the wire and underlying the wire, the strip of fabric being sewn to the strip of plastic mesh with the wire captured therebetween to attach the wire to the mesh strip so that the wire is visible at the bottom of the slot through the interstices in the plastic mesh strip, a seat cover having a portion thereof received into the slot and positioned adjacent the mesh strip, and fastener means receivable through the slot for attaching the seat cover to the wire at any selected point along the continuously visible length of the wire at the bottom of the slot.

2. A bolster wire assembly for embedment in the resilient foam cushion having an upwardly opening slot therein defined by side walls and a bottom wall to permit entry and attachments of a seat cover to the resilient foam cushion, said bolster wire comprising: a wire lying on the bottom wall of the slot and extending continuously therealong, a plastic mesh strip overlying the wire and having interstices therein, the plastic mesh strip having portions thereof extending beyond the side walls with foam received in the interstices to embed the mesh strip in the resilient foam cushion, a strip of fabric sewn to the strip of plastic mesh with the wire captured therebetween to attach the wire to the mesh strip, the interstices in the plastic mesh strip rendering the wire visible along the bottom wall of the slot to facilitate application of fastener means acting between a seat cover and the wire at any selected point along the continuously visible length of the wire at the bottom of the slot.

3. A bolster wire assembly for embedment in a resilient foam cushion having an upwardly opening slot therein defined by side walls and a bottom wall to permit entry and attachments of a seat cover to the resilient foam cushion, said bolster wire comprising: an extruded plastic member including a longitudinally extending central backbone having a wire therein and lying on the bottom wall of the slot and extending continuously therealong, longitudinally extending outboard members spaced laterally each side of the backbone and being embedded in the foam beyond the side walls, longitudinally extending integrally extruded ribs connecting the central backbone with the outboard members, the ribs having interstices cut therein along the length thereof to permit flow of foam through the extruded plastic member during foaming of the resilient cushion to permit embedment of the bolster wire assembly in the resilient foam cushion to anchor the central backbone in a visible position along the bottom wall of the slot and thereby facilitate application of fastener means acting between the seat cover and the central backbone at any selected point along the continuously visible length of the central backbone.

* * * * *